Patented Aug. 26, 1924.

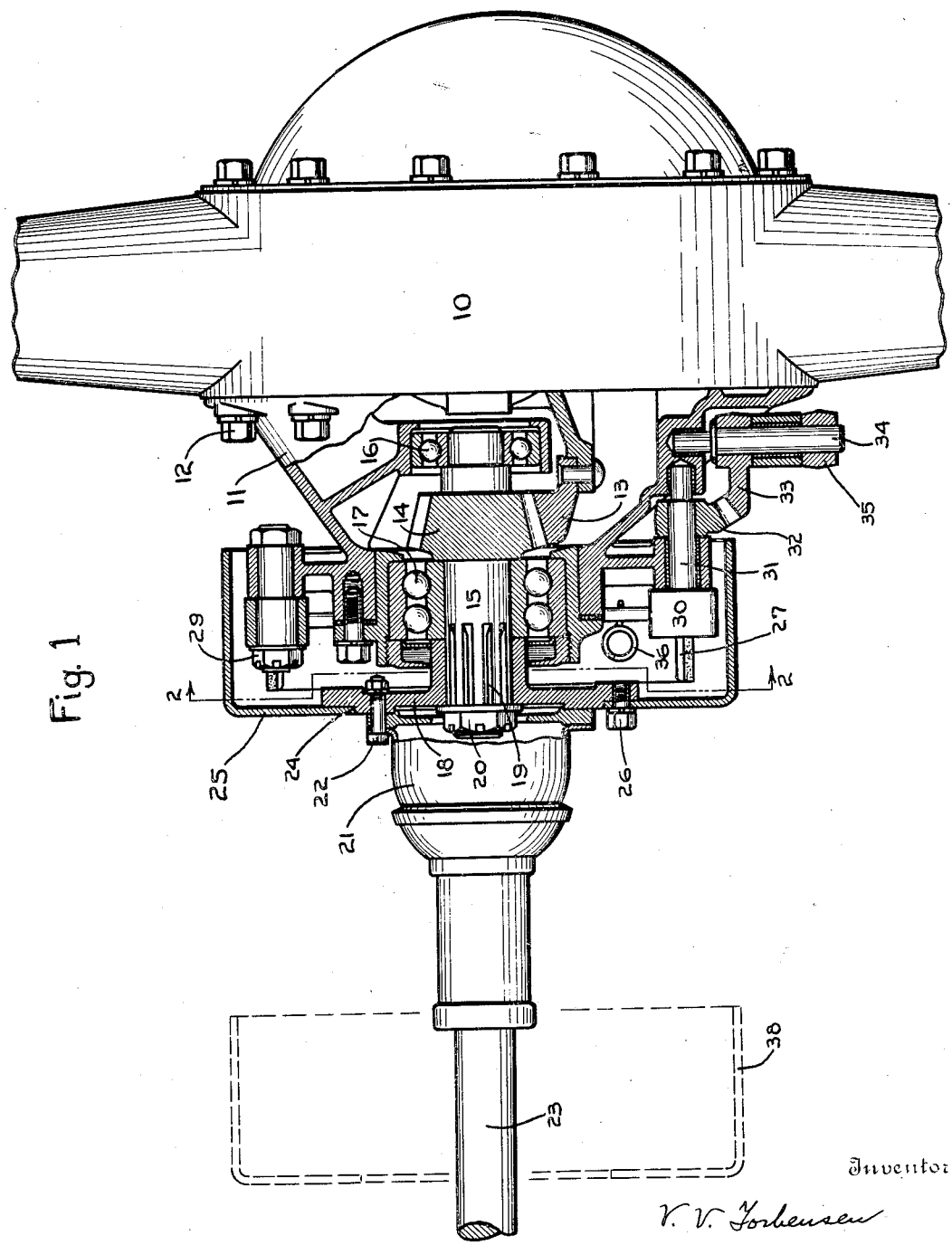

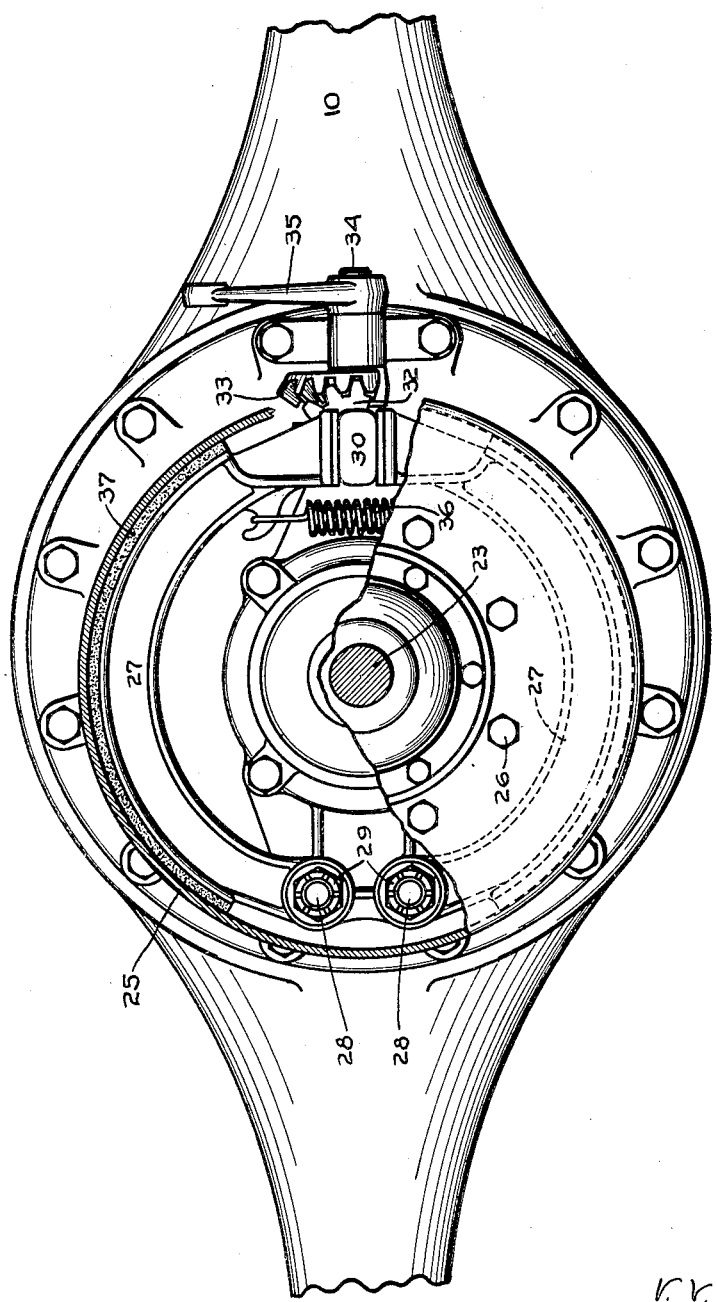

1,506,205

UNITED STATES PATENT OFFICE.

VIGGO V. TORBENSEN, OF CLEVELAND, OHIO, ASSIGNOR TO THE VIG-TOR AXLE COMPANY, OF CLEVELAND, OHIO, A CORPORATION OF OHIO.

BRAKE.

Application filed May 12, 1923. Serial No. 638,552.

*To all whom it may concern:*

Be it known that I, VIGGO V. TORBENSEN, a citizen of the United States, and a resident of Cleveland, county of Cuyahoga, State of Ohio, have invented certain new and useful Improvements in Brakes, of which the following is a specification.

This invention relates to axles for motor vehicles and more particularly to brakes.

One of the objects of the invention is to provide a simple and highly efficient brake that will have long life and be adapted for ready adjustment and replacement. The invention is especially applicable to commercial vehicles and particularly taxicabs where it is desired to keep the vehicle in service as much as possible. To this end the invention comprises a brake of the type known as the propeller shaft brake, so arranged that the mechanism of the brake is housed by the brake drum and thereby protected from mud and water, the brake drum being so mounted that it may be readily detached without disturbing any of the other mechanism, when it is desired to adjust or repair the brake.

Other objects and the features of novelty will be apparent from the following description taken in connection with the accompanying drawings, of which:

Figure 1 is a plan view of a portion of a motor vehicle axle and the propeller shaft, certain parts being shown in section; and Fig. 2 is a composite view with the parts shown in section on the line 2—2 of Fig. 1 and the remainder of the figure being an elevation of the axle as seen from the left of Fig. 1.

Referring to the drawings, 10 indicates the usual axle housing to the front of which is secured the differential carrier 11, by a circle of bolts 12. The differential gear is indicated at 13 and has in mesh therewith the driving pinion 14, which is mounted on the shaft 15. The shaft 15 is supported in the bearings 16 and 17 and has secured to its forward end exteriorly of the axle housing a flanged member 18. The member 18 is secured to the shaft 15 by means of the splines 19 and a nut 20. A universal joint 21, of any suitable construction, is secured to the member 18 by a circle of bolts 22 and the usual propeller shaft 23 is operatively connected with the universal joint 21. The member 18 has an annular shoulder 24 outwardly of the portion to which the universal joint 21 is secured and a brake drum 25 is fitted upon this shoulder and secured to the member 18 by a circle of bolts 26 which are wholly independent of the connection between the universal joint and the member 18. The brake drum is of the usual shape and encloses a pair of brake shoes 27, which cooperates with the interior of the drum. The brake shoes 27 are supported on a pair of studs 28 carried by the differential carrier 11, and are secured on these studs by the nuts 29 or in any other suitable manner. A cam 30, on the shaft 31, actuates the brake shoes 27 in the usual manner. A gear sector 32 is secured on the shaft 31 and is actuated by a sector 33 on a shaft 34 which may be actuated by the usual arm 35. A spring 36 is connected with the shoes 27 in the usual manner and draws the ends of the shoes together upon the cam 30.

In the operation of the brake the arm 35 is moved by the usual brake lever on the vehicle and this in turn actuates the cam 30 which spreads the brake shoes 27 against the interior of the drum 25. The brake shoes are preferably lined with suitable friction material 37, in the customary manner, and when this lining wears to such an extent that replacement thereof is necessary, the circle of bolts 26 is removed and the brake drum 25 slipped over the universal joint to a position on the propeller shaft such as is indicated in dotted lines at 38 in Fig. 1. The brake shoes 27 are thus exposed for adjustment or replacement and if it is desired to replace the shoes the nuts 29 are removed and the shoes taken off and replaced by others. The brake drum 25 is then restored to its position on the member 18 and the bolts 26 replaced, the shoulder 24 insuring concentricity of the drum with the shaft 15. It will be seen that this operation may be quickly performed so that in order to replace the brake shoes it is not necessary to tie up the vehicle for more than a few minutes.

The arrangement of the brake drum 25 with its open side toward the axle housing 10, or, in other words, toward the rear, provides a protection for the brake from mud and water. The securing of the brake drum 25 to the member 18 wholly independently of the means for securing the universal joint to this member has the additional advantage of permitting the universal joint to be arranged at the minimum distance from the axis of the axle, which is an important factor in axle design.

Having thus described my invention, what I claim is:

1. In apparatus of the class described, the combination with an axle having a driving shaft projecting therefrom, of a flanged member secured on said shaft, a propeller shaft operatively connected to said flanged member, and a brake drum secured to the flange of said member outwardly of said propeller shaft connection and independently thereof.

2. In apparatus of the class described, the combination with an axle having a driving shaft projecting therefrom, of a flanged member secured on said shaft, a universal joint secured to said flanged member, a propeller shaft operatively connected with said universal joint, a brake drum carried by said flanged member independently of said universal joint, and a brake within said drum, the construction and assemblage of the parts being such that said brake drum may be detached from said flanged member without disturbing said universal joint and then moved to a position on said propeller shaft to expose said brake for adjustment or removal.

3. In apparatus of the class described, the combination with an axle having a driving shaft projecting therefrom, of a flanged member secured on said shaft and having an annular shoulder, a universal joint secured to said flanged member within the area bounded by said shoulder, a propeller shaft operatively connected with said universal joint, a brake drum fitted upon said shoulder, bolts securing said brake drum to said flanged member outwardly of said shoulder and independently of the means for securing said universal joint to said member, and a brake carried by said axle within said drum and cooperating therewith.

In testimony whereof I affix my signature.

VIGGO V. TORBENSEN.